April 5, 1927.
G. C. MARTIN
SHOCK ABSORBER
Filed May 26, 1925
1,623,428
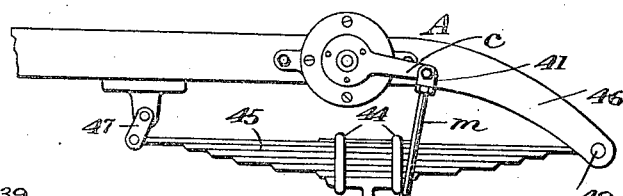
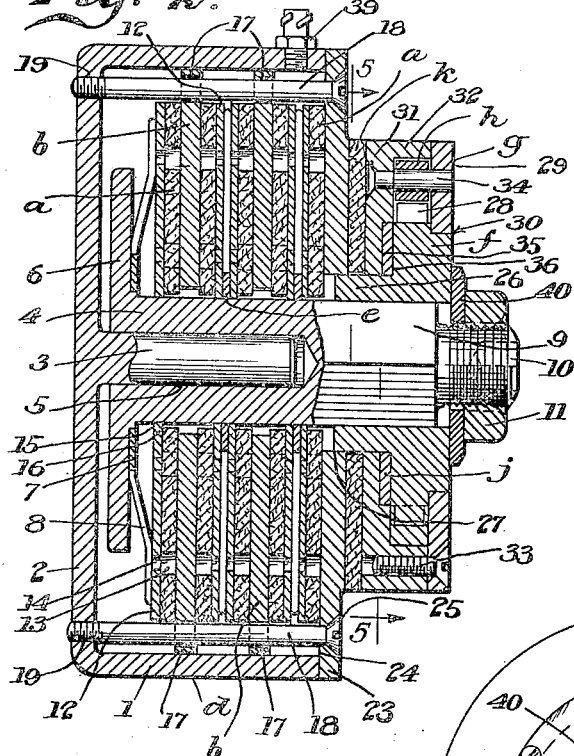
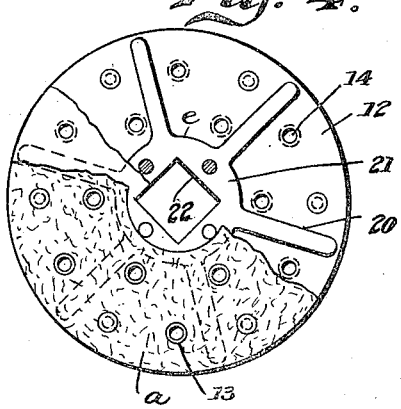
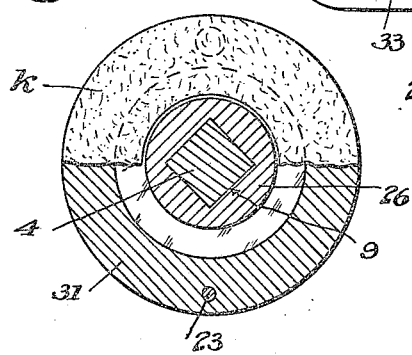
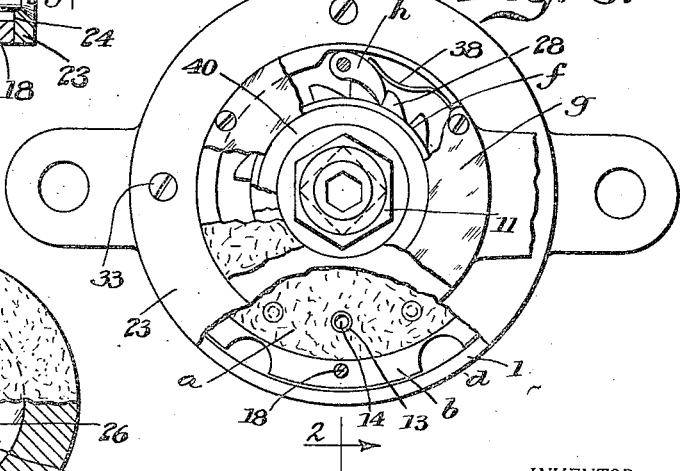
INVENTOR,
George C. Martin;
BY
Blakeslee & Brown,
ATTORNEYS.

Patented Apr. 5, 1927.

1,623,428

UNITED STATES PATENT OFFICE.

GEORGE C. MARTIN, OF LOS ANGELES, CALIFORNIA.

SHOCK ABSORBER.

Application filed May 26, 1925. Serial No. 32,928.

This invention relates to shock absorbers of the class which is adapted to be associated between a vehicle frame and a spring member to check recoil of the spring. More particularly the shock absorber is of the friction type in that it employs rotating and non-rotating friction discs.

Friction shock absorbers operating on the disc principle have been in use, but almost universally the shock absorber arm moves freely in one direction and is limited as to movement in a second direction. My present invention has for an object the provision of a shock absorber which exerts a maximum resistance when moved in one direction and a minimum resistance when moved in a second direction, there being resistance of movement in either direction of the shock absorber.

It is customary in certain types of friction shock absorbers to provide a ratchet and pawl, the ratchet being associated with the movable discs of the absorber and an arm associated with the pawl, said arm being connected through the medium of a link or connecting rod with the vehicle spring. When the arm moves upwardly the pawl will move along one of the ratchet teeth and if the upward movement of the arm is sufficient the pawl will drop into a following tooth. The distance between the teeth of the ratchet is termed the neutral position, that is, practically no friction is exerted in either direction while the pawl is moving over the neutral position. This arrangement, however, is not desirable for the reason that a sudden shock causes the pawl to strike a tooth unduly hard and causes wear between the pawl and the tooth. Another disagreeable effect is produced in the vehicle itself, for the reason that the recoil of the spring is suddenly checked after the pawl has moved over the neutral position. In other words, the spring has an opportunity to expand and such expansion by being suddenly checked causes a jar to the vehicle frame. It is not necessary to use a pawl and ratchet in one-way friction clutches, but almost all forms of clutches operate upon the principle of practically no resistance in one direction of movement and a major resistance in a second direction. With my invention I intend to provide a novel form of shock absorber operating on the clutch principle in which a major resistance will be exerted by the clutch when it is moved in one direction and a percentage of such major resistance when the clutch is moved in a second direction. Thus when a ratchet and pawl is used this percentage of the major resistance exerted by the minor resistance of the clutch will effectively prevent the pawl from striking a ratchet tooth unduly hard when the pawl moves over the neutral position of the tooth. It is most desirable where the ratchet and pawl device are utilized for the absorbers to make the teeth of the ratchet long or to place the teeth far apart as this gives a long neutral position, which neutral position is necessary in order to relieve spring stiffness. If the teeth of the ratchet are close together the clutch will operate upon any road inequality and for this reason the clutch must be tightened so as to successfully check a major rebound of a spring when the vehicle wheels strike a large road inequality. As a consequence small inequalities are practically not absorbed because the spring is held by the absorber. If we provide ratchet teeth which are spaced far apart to provide what is known as a neutral position the absorber would not function upon small road inequalities with the result that the absorber could be tightened so as to accommodate for large road inequalities. It is necessary, however, for ease of riding, to arrange the shock absorber so that there will be some resistance to absorb the recoil of the springs due to small road inequalities. My shock absorber is novel in that it will control spring re-action of any magnitude and small re-actions due to small road inequalities are as effectively handled as large road recoils due to large road inequalities. I am therefore of the opinion that my invention which calls for a major resistance to the movement of a vehicle spring in one direction with a minor resistance to movement of the vehicle spring in an opposite direction, is new, and also that an invention which calls for a major resistance to movement of a vehicle spring in one direction with a minor resistance to the vehicle spring in either direction over a neutral position, is also new.

The invention has for a further object the provision of an improved shock absorber which will be superior in point of relative simplicity and inexpensiveness, taken in conjunction with utility, durability and general efficiency and serviceability.

With the above mentioned and other objects in view, the invention consists in the novel and useful provision, formation, construction, association and relative arrangement of parts, members and features, all as shown in certain of its embodiments in the accompanying drawing, described generally and more particularly pointed out in claims.

Referring to the drawing,

Figure 1 is a fragmentary side elevation illustrating a shock absorber embodying the invention attached to a vehicle frame with a link between such shock absorber and a spring member whose recoil is to be checked by the shock absorber;

Figure 2 is a transverse vertical sectional view of the shock absorber, the same being taken on the line 2—2 of Figure 3;

Figure 3 is a fragmentary end view of the shock absorber and showing certain details of its construction;

Figure 4 is a fragmentary detail of certain features of construction of the shock absorber; and, Figure 5 is a cross sectional view on the line 5—5 of Figure 2 and on a reduced scale from the showing of Figure 2.

Corresponding parts in all the figures are designated by the same reference characters.

Referring with particularity to the drawing, the improved shock absorber is designated as an entirety and in one embodiment by A, and the same includes one or more rotating disc members $a$ and one or more non-rotating disc members $b$, the said disc members $a$ and $b$ being adapted to frictionally engage, in combination with an arm $c$ adapted to produce rotation of the members $a$ when the arm is moved. The discs $a$ and $b$ constitute what may be termed a clutch device in that from the very construction of the absorber, the said discs $a$ and $b$ grip when the arm $c$ is moved in one direction to exert a retarding motion to movement of such arm with the said discs $a$ not rotated when the arm $c$ is moved in an opposite direction. The said discs $a$ and $b$ are adapted to be received and confined within a casing or housing $d$, which may be of any shape desired, that in the drawing showing a casing having a curved wall 1 with an interconnecting back wall or plate 2. The said back wall is provided with a central axle 3 which is received within the confines of the wall 1, and adapted to be carried on such axle is a shaft 4, said shaft being formed with a central bore 5 to receive the said axle. The shaft 4 is provided with a flanged end 6, which flanged end is adapted to carry a member 7 provided with a plurality of spring fingers 8. This particular member 7 is often called a clover-leaf spring. The shaft 4 preferably has its periphery provided with angularly disposed faces 9 to provide what may be termed a square shaft, and the said shaft is likewise provided with a screw-threaded portion 10 of reduced diameter upon which is carried an adjusting nut 11. The discs $a$ are preferably formed of some friction material such as leather and which discs carry metal backing 12 so that the said discs are kept from warping. Both the discs $a$ and their metal backing 12 are provided with transverse perforations as illustrated at 13 and 14 for lubrication purposes. The said discs $a$ with the metal backing 12 are formed with central openings 15 and 16 of a form corresponding to the form of the shaft 4, that is, if a square shaft were provided there would be a square opening for the metal backing 12 and the discs $a$ so that rotation of the shaft would produce rotation of the metal backing and the discs $a$. The discs $b$ are preferably formed of metal and said discs $b$ are non-rotatable, said discs this end being provided with transverse bores 17 through which bolts or the like 18 are passed and which bolts are secured to the casing $d$ as shown at 19. The discs $a$ with their metal backing do not contact with the bolts or retaining means 18, as illustrated in Figure 2. The arrangement is such that two discs $a$ will bear against opposite surfaces of each disc $b$. In the showing I have provided two discs $b$ and four discs $a$, and it will be noted that the metal backs of two of the discs $a$ are back to back. I separate these metal backs of the discs $a$ by a spacer member $e$, which spacer member may comprise a member provided with spaced radial arms 20, with a central portion 21 from which said arms radiate, formed with a squared opening 22 so as to fit upon the squared shaft 4. In order to suitably encase the discs $a$ and $b$ I have provided a cover plate 23 which is formed with a smooth inner surface 24, and I have provided a disc $a$ adapted to bear against such smooth inner face 24, the metal backing of such disc $a$ being spaced from the metal backing of an adjacent disc $a$ by one of the spacer members $e$. The securing means or bolt 18 is headed, as shown at 25, and the cover plate is provided with one or more transverse openings so that the said retaining means may be passed therethrough to secure the cover plate to the casing $d$. The cover plate is annular in form and a ratchet $f$ has its hub portion 26 in part received within the annular opening of such cover plate, as shown at 27.

A housing $g$ is provided for the ratchet $f$ which housing likewise acts to confine a pawl $h$ which cooperates with the ratchet teeth 28. The said housing $g$ includes an annular cover plate or disc 29 fitted within an annular grooved portion 30 of the ratchet $f$ and an annular plate 31 formed with a flange 32, the said flange 32 being adapted to abut against the inner surface of the plate 29 and provide a space for confining the pawl h. The parts of the ratchet housing g are conveniently held together by screws or the like 33, and a pin 34 is passed through the housing and carries the pawl thereon, as shown in Figure 2. The member 31 is annularly grooved as shown at 35 to provide a space between the member 31 and a surface 36 of the ratchet f, and adapted to be received in the annular grooved portion 35 is a member j preferably formed of some frictionless material such as brass. Adapted to be received between the outer faces of the cover plate 23 and the member 31 is a friction washer k. A leaf spring 38 is adapted to bear against the pawl h to normally urge the pawl into engagement with the teeth 28 of the ratchet f. The casing d is tapped to receive an oil feed 39 so that the casing d may be filled with lubricant for lubricating the surfaces of the discs a and b. The oil will flow through the openings 13 and 14 and as the discs a are rotated the oil will flow between the working surfaces of the discs. A washer 40 is interposed between the nut 11 and the outer surfaces of the ratchet f. The central opening of the ratchet f corresponds in shape to the shaft e so that rotation of the ratchet will produce rotation of the shaft.

The operation of the device is as follows:

The ratchet housing g is provided with an arm c and a connecting link m is joined with said arm c through the medium of an oscillating joint 41 and likewise connected to a clamp member 42, the clamp member being secured to an axle 43. The axle in turn is secured by means of clamps 44 to a leaf spring 45. The leaf spring in the embodiment of the invention is secured to a vehicle frame 46 by suitable shackle means 47 and 48. When the spring 45 is compressed due to the wheels which are associated with the axle 43 striking road inequalities the connecting link m will move upwardly to move the arm c upwardly and if the inequality is great enough to cause the pawl h to engage a following ratchet tooth, the clutching action of the discs a and b will come into play and check the spring rebound. It will be noted that the ratchet teeth 28 are spaced a considerable distance apart in order to allow a considerable amount of free play at the end of the arm c. This distance of play is known as a neutral position. In other words, the shock absorber discs do not act over this distance for the reason that the pawl would move along a tooth face and move back without in any manner attempting to turn the ratchet. As stated in the preamble this neutral position is desirable in some particulars, as it will allow the springs to be less stiff and the pressure between the co-acting surfaces of the discs a and b can be adjusted so as to properly control large spring re-actions.

However, minor road inequalities will not be handled and the vehicle frame will be considerably jarred. This is particularly true if the pawl moves almost the entire neutral position distance of a tooth and then moves back again to hit a tooth. This constant wear is disastrous both to the pawl and to the tooth. Accordingly in my invention I first adjust the pressures that may exist between the discs a and b by turning the adjusting nut 11 which will draw the square shaft inwardly to compress the spring fingers 8 against the metal backing of one of the discs a. This will of course compress all of the members a and b together and compress the last disc a against the inner surface of the cover plate 23. At the same time the ratchet housing will bear against the disc k and press the same as between the outer surface of the cover plate and the outer surface of said housing g. If we have turned the adjusting nut so that the leaf spring exerts a friction resistance between the discs a and b of thirty pounds when the arm c is moved, and inasmuch as in the showing I have provided five of said friction discs a, the total resistance within the housing d would be one hundred and fifty pounds. The discs k between the housing g and the cover plate 23 would likewise exert a resistance to movement of thirty pounds which would make the total resistance to movement of the arm c one hundred and eighty pounds, when the pawl h has moved sufficiently to engage a ratchet tooth to rotate the discs a. If the pawl h only moved over the neutral position of a tooth the movement of the arm c would be controlled by a resistance of thirty pounds which is operative at all times whether the arm c is moved upwardly or downwardly. This would naturally follow because of the friction disc k. This system is far superior to using small ratchet teeth because small ratchet teeth make the spring 45 uncomfortably stiff for the reason that the total resistance to movement of the arm c would be at all times operative. Hence, I have provided by this shock absorber a major and a minor degree of friction which will be very simply controlled by varying the number of friction dies on the inside of the shock absorber housing.

It is obvious that various changes and modifications may be made in practicing the invention, in departure from the particular showing of the drawing, without departing from the true spirit of the invention.

Having thus disclosed my invention, I claim and desire to secure by Letters Patent:

1. In improvements in shock absorbers, an arm member, a pair of friction members, said arm member being permitted to move over a determined neutral position thereof prior to moving one of the friction members, the other friction member at all times exerting a constant and even resistance to movement of the arm member over the neutral position.

2. In a device of the character disclosed, a pair of rotating friction members, means for producing relative rotative movement between the said friction members, including a ratchet and a pawl, a housing for said pawl, and anti-friction means between the housing and the ratchet.

3. In a device of the character disclosed, a casing, a pair of friction discs within said casing, means for relatively turning said discs including a shaft upon which one of said discs is mounted and a ratchet and pawl, a housing for said pawl, a friction disc between the pawl housing and the casing, whereby there is a resistance to movement of the pawl housing at all times.

4. In a device for retarding vehicle springs, comprising rotatable and substantially parallel friction disc members, means for causing movement of said friction disc members, and means between the first named means and one of said friction discs whereby a major resistance to movement of the vehicle spring is offered when the vehicle spring is moved in one direction, with a minor resistance to movement of the vehicle spring in either direction over a neutral position.

5. A retarding device for vehicle springs, including a pair of substantially parallel friction discs, means for turning one of the friction discs, neutral position means whereby the first means is allowed movement without rotation of one of the friction discs, the other of said friction discs offering constant resistance to movement of the first named means in either direction, and whereby a constant pre-determined minor degree of friction is at all times offered to movement of the vehicle spring.

6. In improvements in shock absorbers, an arm member, a pair of friction members, said arm member being permitted to move over a determined neutral position thereof prior to moving one of the friction members, the other friction member at all times exerting a constant even resistance to movement of the arm member over the neutral position, and common means for adjusting the friction of said friction members.

In testimony whereof, I have signed my name to this specification.

GEORGE C. MARTIN.